(12) United States Patent
Darveau et al.

(10) Patent No.: US 6,466,586 B1
(45) Date of Patent: Oct. 15, 2002

(54) DIGITAL SUBSCRIBER LINE FRAMING STRUCTURE SUPPORTING IMBEDDED RATE ADAPTIVE SYNCHRONOUS AND ASYNCHRONOUS TRAFFIC

(75) Inventors: Michel Darveau, Aylmer (CA); Emil Lander, Nepean (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/050,924

(22) Filed: Mar. 31, 1998

(51) Int. Cl.[7] .................................................. H04J 3/16
(52) U.S. Cl. ....................................... 370/468; 370/353
(58) Field of Search ............................... 370/352, 353, 370/437, 468, 470, 512, 514, 503, 509, 506, 528; 379/93.01, 93.09, 93.14, 93.15, 93.05, 93.06, 93.07, 93.08

(56) References Cited

U.S. PATENT DOCUMENTS

| | | | |
|---|---|---|---|
| 4,761,781 A | * 8/1988 | Calvignac et al. | 370/352 |
| 5,392,280 A | * 2/1995 | Zheng | 370/352 |
| 5,461,616 A | 10/1995 | Suzuki | |
| 5,479,447 A | 12/1995 | Chow et al. | |
| 5,557,614 A | 9/1996 | Sandler et al. | |
| 5,608,734 A | 3/1997 | Sandler et al. | |
| 5,668,857 A | 9/1997 | McHale | |
| 5,903,608 A | * 5/1999 | Chun | 370/468 |

* cited by examiner

Primary Examiner—Huy D. Vu
(74) Attorney, Agent, or Firm—Max R. Wood; Ogilvy Renault

(57) ABSTRACT

A digital subscriber line framing structure supporting imbedded rate adaptive synchronous and asynchronous traffic. The frame includes a system for alternating a first payload group for the synchronous traffic with a second payload group for the asynchronous traffic in the payload portion of the frame. The size of at least one of the first and second payload groups can be modified for adapting to variations in demand for synchronous traffic over the digital subscriber line or for data rate variations over the subscriber line due to line quality variations.

14 Claims, 5 Drawing Sheets

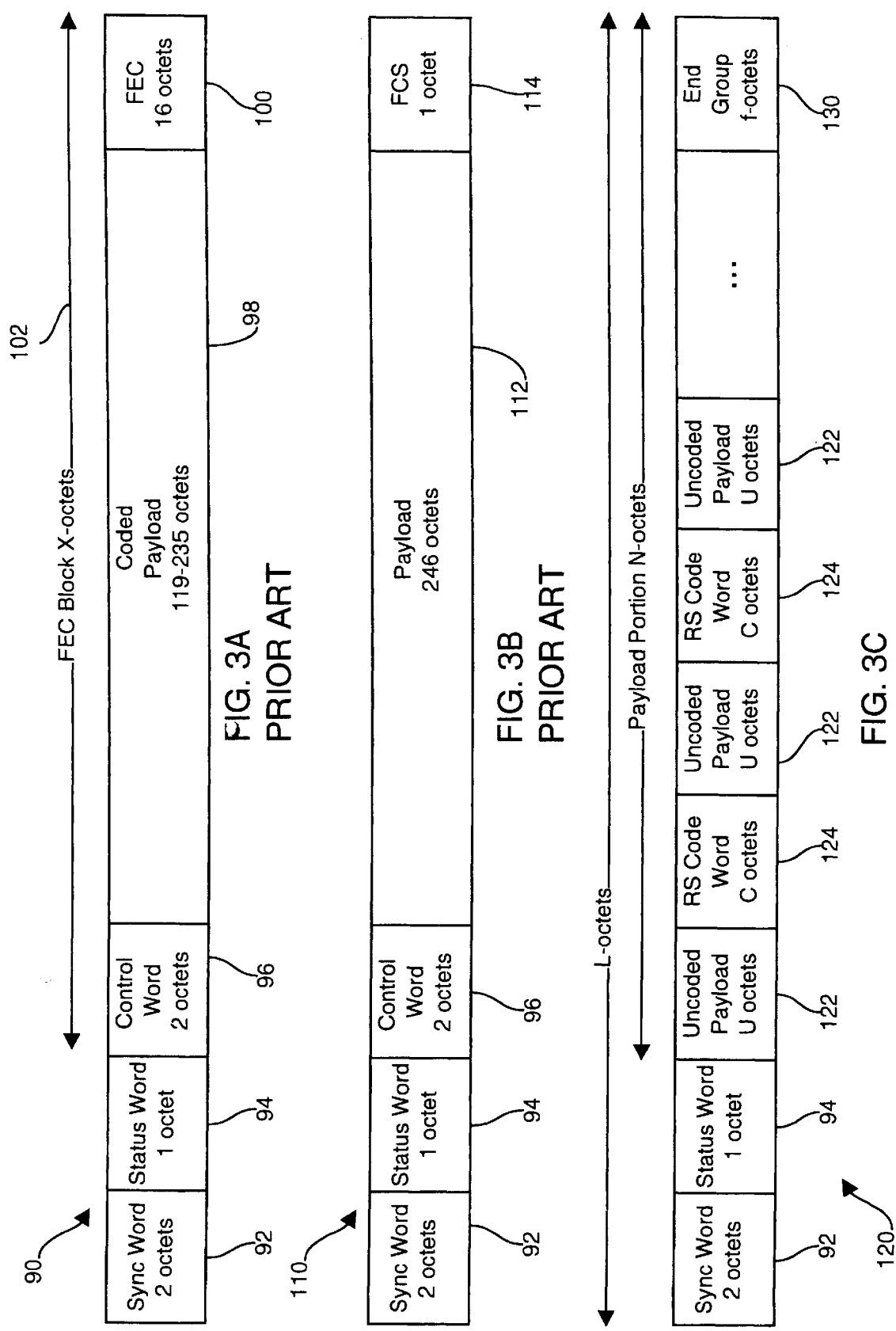

DIGITAL SUBSCRIBER LINE FRAMING STRUCTURE SUPPORTING IMBEDDED RATE ADAPTIVE SYNCHRONOUS AND ASYNCHRONOUS TRAFFIC

FIELD OF THE INVENTION

This invention relates to the field of framing structures for digital subscriber lines, and more particularly to frames having a payload portion supporting imbedded synchronous and asynchronous traffic for communication over a digital subscriber line.

BACKGROUND OF THE INVENTION

Communication systems are used to transmit and receive signals over a communication channel. One common form of communication system is a telephone system for transmitting and receiving voice and data signals. In a digital communication system signals representing digital data are sent over a transmission medium. A digital subscriber loop/line (DSL) is a digital telecommunications system operating over existing copper telephone lines (unshielded twisted pair-UTP), as opposed to optical fiber.

Digital signals typically have greater capacity of information and less noise problems than analog signals. The data transmitted over a DSL is typically organized according to a specific format so that two communicating parties are able to recognize and retrieve the data using the same format. To accomplish this, data is organized into frames. Frames are blocks of serial information that are transmitted consecutively, where each frame generally includes the same amount of data. The data in a frame is typically surrounded by framing information for synchronization and error checking.

Typical DSL technologies to support the requirement of independent and simultaneous voice and data transmission over the same phone line include: asymmetrical digital subscriber line (ADSL) and rate adaptive digital subscriber line (RADSL) technologies. ADSL that allows for the transmission of about 6 Mbps over existing UTP (1.544 to 6.144 Mbps downstream (i.e. central office to customer) and 16 to 640 kbps upstream (i.e. customer to central office).

Voice as an analog signal is handled at each end of the connection through a splitter which ensures that it is unaffected by the presence or absence of digital data. In this way, the voice signal and the digital data signal are transmitted simultaneously over the twisted pair while occupying different frequency bands and not interfering with each other. Video and data inputs (asynchronous traffic) are time division multiplexed into the digital ADSL signal which originates in an ADSL transmission unit-central office (ATU-C). The signal then travels the local loop, terminating in an ADSL Transmission Units-Remote (ATU-R) located on customer premises.

There is an increasing demand for more phone lines to be located at the customer premises to support multiple telephones and/or computers or facsimile machines. This creates a need to carry the voice band traffic in a digital form and embed it in the data stream. This allows a reduction in the number of twisted pairs entering the dwelling, but imposes new requirements on the data path. Digitized voice requires minimal transport delay and synchronous operation in that each voice sample must be received at a precise time interval.

The rate adaptive digital subscriber line (RADSL) technology is an advance over other DSL implementations because its transmission speed is rate-adaptive based on the length and signal quality of an existing telephone line. Products based on RADSL have the option of selecting the highest practical operating speed automatically or as specified by a service provider. However, this rate adaptation can impact the quality of the digital voice channels that require a precise and constant data rate. The variation of the loop signal data rate must be totally absorbed by the data channel traffic. In addition, there are situations where the data rate allocated to the voice traffic must be changed, such as when a communication terminates or if a new one begins.

Consequently, there is a need to provide a DSL framing structure supporting imbedded rate adaptive synchronous and asynchronous traffic that can be automatically adjusted to (a) provide more bandwidth for synchronous traffic when the synchronous load is increased; (b) reduce the bandwidth for synchronous traffic when the demand for synchronous use is reduced; and (c) adjust the bandwidth for asynchronous traffic when the line quality increases or decreases.

SUMMARY OF THE INVENTION

An object of the present invention is to provide a DSL framing structure capable of supporting rate adaptive allocation of bandwidth to synchronous traffic and to asynchronous traffic over the same frame structure.

Another object of the present invention is to provide a method for adding or removing synchronous traffic dynamically to a DSL frame structure as opposed to maintaining a fixed synchronous/asynchronous traffic mix.

Another object of the present invention is to provide a DSL framing structure that provides a minimal delay path for synchronous traffic.

In accordance with an aspect of the present invention there is provided a frame having a payload portion supporting imbedded synchronous and asynchronous traffic for communication over a digital subscriber line having a prescribed data rate, comprising: (a) a first payload group for the synchronous traffic in the payload portion of the frame, said first payload group having a prescribed size;(b) a second payload group for the asynchronous traffic in the payload portion of the frame, said second payload group having a prescribed size; and (c) means for modifying the prescribed size of the first payload group and the prescribed size of the second payload group.

In accordance with another aspect of the present invention there is provided in a communication system transmitting a prescribed data rate over a digital subscriber line for simultaneously accommodating synchronous traffic from a synchronous device and asynchronous traffic from a asynchronous device, a frame having a payload portion comprising: (a) a plurality of first payload groups of width U bytes for the synchronous traffic in the payload portion of the frame; (b) a plurality of second payload groups of width C bytes for the asynchronous traffic in the payload portion of the frame; and (c) an algorithm for defining and modifying U and C for adapting to variations in demand for synchronous traffic over the digital subscriber line.

In accordance with another aspect of the present invention there is provided in a communication system having a digital subscriber line having a prescribed data rate and a signal-to-noise ratio (SNR), a method for simultaneously accommodating synchronous traffic from a synchronous device and asynchronous traffic from a asynchronous device, said method comprising: (a) alternating a plurality of first payload groups of width U bytes for synchronous traffic with a plurality of second payload groups of width C bytes for the asynchronous traffic in the payload portion of the frame; and (b) modifying U and C for adapting to variations in demand for synchronous traffic over the digital subscriber line.

BRIEF DESCRIPTION OF THE DRAWINGS

The present invention will be described in conjunction with the drawings in which:

FIG. 3A represents an example of a prior art frame structure for transporting only asynchronous traffic;

FIG. 3B represents an example of a prior art frame structure for transporting either asynchronous or synchronous traffic;

FIG. 3C represents the DSL framing structure of the present invention; and

DETAILED DESCRIPTION OF EMBODIMENTS OF THE INVENTION

Figure 1:
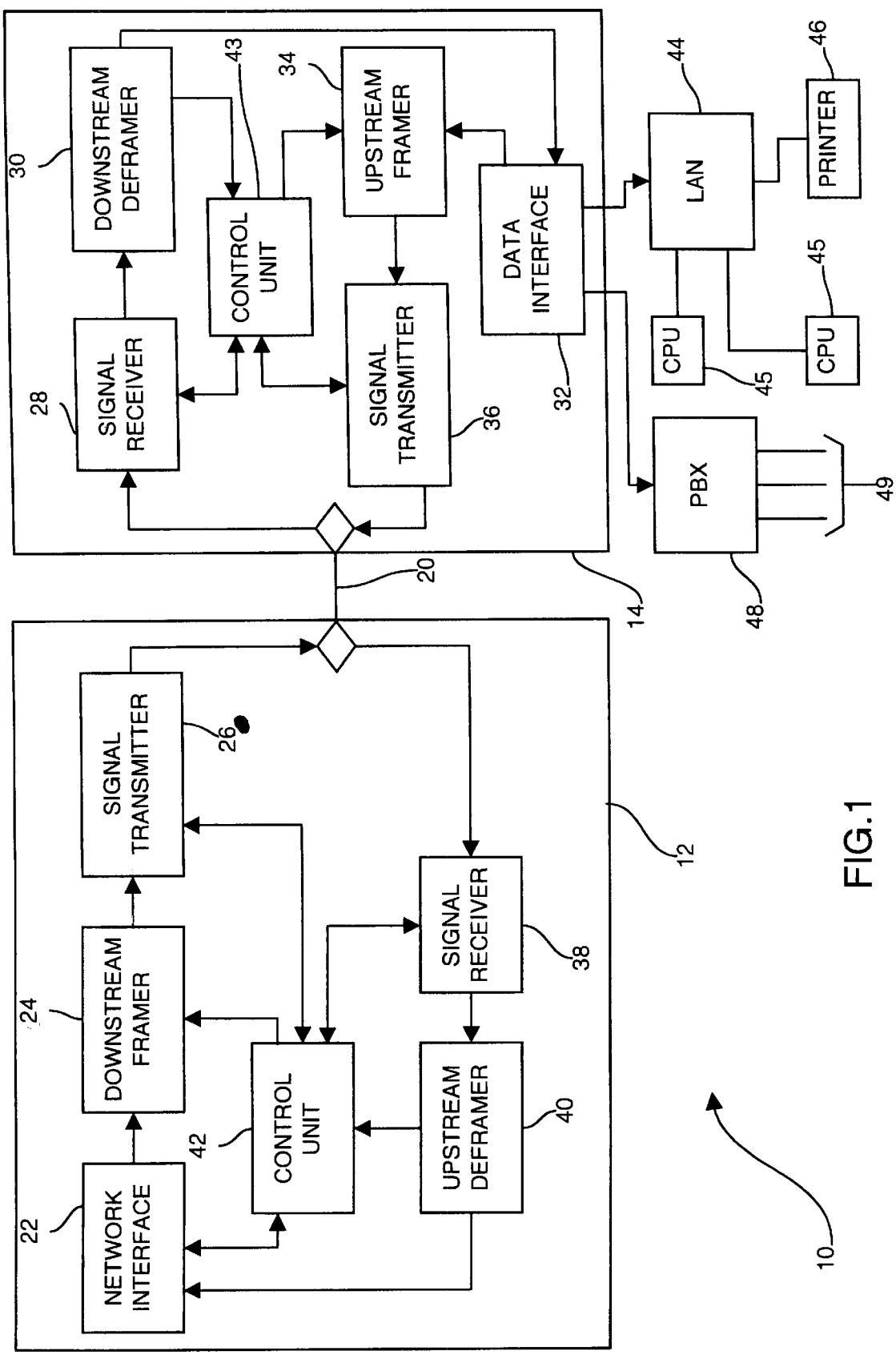
FIG. 1 is a block diagram representation of a typical communications system using digital subscriber lines implementing the DSL framing structure of the present invention.

FIG. 1 is a block diagram illustrating a digital subscriber line communication system 10 as an example of a system that incorporates the DSL framing structure of the present invention. The system 10 includes a central unit 12 and a remote unit 14, located at a customer premises, linked together by a subscriber loop 20.

The central unit 12 receives data from a network interface 22 and processes it in a downstream framer 24 to produce a framed signal. The framed signal is then passed to a downstream signal transmitter 26 where the signal is modulated prior to being applied to the subscriber loop 20. At the remote unit 14, the modulated signal (sent by transmitter 26) is received and demodulated by a signal receiver 28. The demodulated signal is passed to a downstream de-framer 30 after which it is applied to a data interface 32.

The remote unit 14 also processes data from the data interface 32 that is passed to an upstream framer 34 to produce a framed signal. The framed signal is then passed to an upstream signal transmitter 36. The transmitted signal travels over the subscriber loop 20 and is received by a signal receiver 38 after which it is passed to an upstream de-framer 40 and subsequently to the network interface 22. A control unit 42, for the central unit 12, and a control unit 43, for the remote unit 14 coordinate the transfer of signals between the various modules in their respective units.

The signals originating and terminating in the data interface 32 are of two types: data and voice. (1) Data traffic is applied to a local area network (LAN) 44 that may connect a plurality of computers (CPUs) 45 and one or more printers 46. (2) Voice traffic is applied to a private branch exchange (PBX) 48 that connects a plurality of telephone lines 49. The PBX 48 is shown for illustration purposes, in cases where a small number of telephone lines are being used, typically PBX functionality can be included in the remote unit 14 itself as is well known in the art.

Figure 2A:
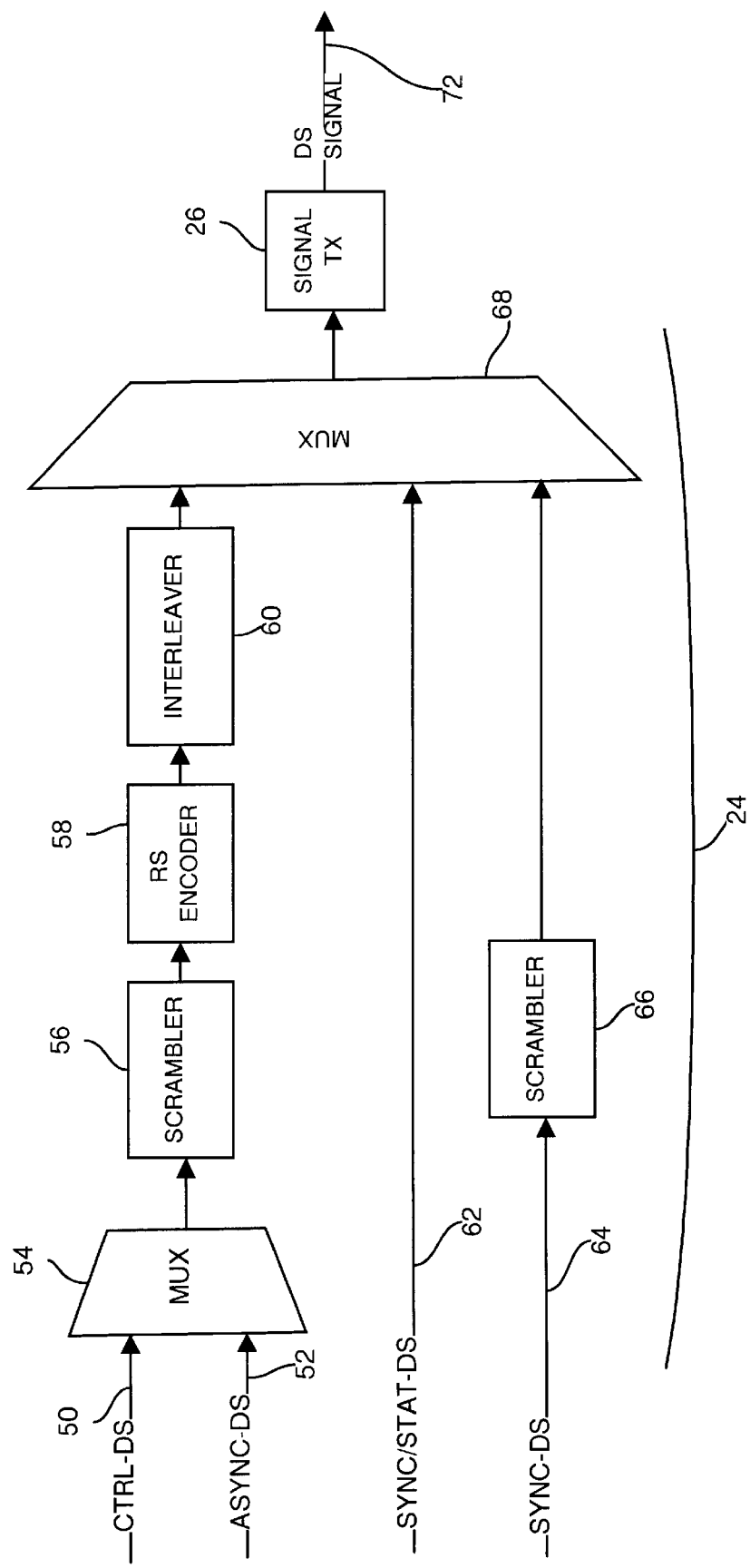
FIG. 2A is a functional block diagram representing the downstream framer of FIG. 1.

FIG. 2A shows a functional block diagram of the downstream framer 24 of the central unit 12. A downstream control channel (ctrl-ds) 50 and downstream asynchronous (async-ds) traffic 52 (supplied from the network interface 22 of the central unit 12) are multiplexed by the multiplexer 54 then passed sequentially through the scrambler 56, a Reed-Solomon (RS) encoder 58 and an interleaver 60. This processing is performed on the async-ds 52 (e.g. data ultimately destined for the LAN 44) to ensure data security and integrity and are well known to those skilled in the art.

The result of the ctrl-ds 50 and async-ds 52 processing is multiplexed, by a second multiplexer 68, with a synchronization/status (sync/stat-ds) signal 62 and downstream synchronous (sync-ds) traffic 64 (supplied from the network interface 22 of the central unit 12), which has been scrambled by a scrambler 66. The sync-ds 64 traffic (e.g. voice signals ultimately destined for the PBX 48) are scrambled by the scrambler 66 for randomization purposes and use techniques which are well known to those skilled in the art.

The output of the second multiplexer 68 is passed to the signal transmitter 26 (which can incorporate quadrature amplitude modulation (QAM) for example) to produce a downstream signal (ds-signal) 72, which is passed to the subscriber loop 20 as discussed above in conjunction with FIG. 1.

Figure 2B:
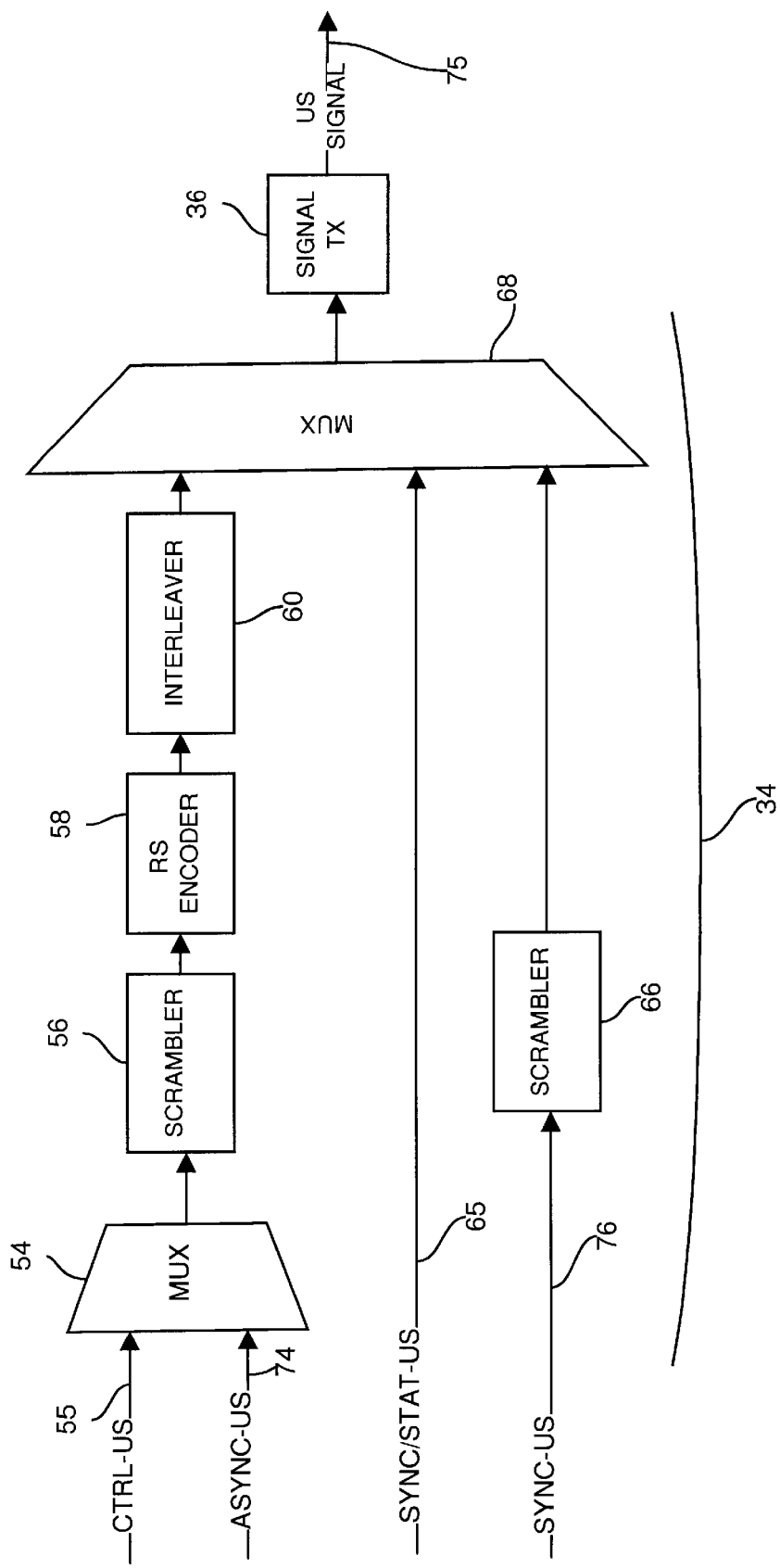
FIG. 2B is a functional block diagram representing the upstream framer of FIG. 1.

FIG. 2B shows a functional block diagram of the upstream framer 34 of the remote unit 14. The upstream framer 34 has a similar architecture to the downstream framer 24 with the exception of the signalling as discussed below. A upstream control channel (ctrl-us) 55 and upstream asynchronous (async-us) traffic 74 (supplied from the data interface 32 of the remote unit 14) are multiplexed by the multiplexer 54 then passed sequentially through the scrambler 56, the Reed-Solomon (RS) encoder 58 and the interleaver 60. This processing is performed on the async-us 74 (e.g. data from the LAN 44) to ensure data security and integrity and are well known to those skilled in the art.

The result of the ctrl-us 55 and async-us 74 processing is multiplexed, by the second multiplexer 68, with the synchronization/status (sync/stat-us) signal 65 and upstream synchronous (sync-us) traffic 76 (supplied from the data interface 32 of the remote unit 14), which has been scrambled by the scrambler 66. The sync-us 76 traffic (e.g. voice signals from the PBX 48) are scrambled by the scrambler 66 for randomization purposes and use techniques which are well known to those skilled in the art.

The output of the second multiplexer 68 is passed to the signal transmitter 36 (which can incorporate quadrature amplitude modulation (QAM) for example) to produce an upstream signal (us-signal) 75, which is passed to the subscriber loop 20 as discussed above in conjunction with FIG. 1.

The de-framers 30 and 40 function in the opposite manner of the framers 24 and 34 to de-frame the signals received from the signal receivers 28 and 38, respectively.

FIG. 3A illustrates a prior art asynchronous frame structure 90 that is intended for transport of coded asynchronous (data, video) payloads, with no transport capability for uncoded synchronous (voice, ISDN) payloads. The asynchronous streams are protected against channel impairments (noise etc.) with an interleaved Reed-Solomon code. The framing structure 90 of FIG. 3A is suitable for systems intended for the transport of data and broadcast video services.

The frame structure 90 defines the order in which various bytes are output from the framers 24 and 34 to the respective signal transmitter 26 and 36, and the type of processing that each transport stream is to encounter. The frame structure 90 includes a 2-octet sync word 92, a 1-octet status word 94, a 2-octet control word 96, a variable number of coded payload octets (between 119 and 235) 98, and 16 octets of FEC redundancy 100. The 2-octet control word 96, the coded payload 98 and the FEC 100 together constitute an FEC block 102 representing a RS code word of length X octets, where X is an odd integer satisfying $137 \leq X \leq 253$. The ability to negotiate the value of X for a communications link allows operators to trade-off FEC overhead percentage versus coding gain for different applications and line conditions.

The sync word 92 is used to identify a frame boundary at the signal receiver (28 or 38). The status word 94 allows the transmission of data without suffering interleaver delay. The control word 96 is used to establish a communication channel between the control units 42 and 43. The coded payload 98 is the useful data information to be transported over the subscriber loop 20. The FEC portion 100 of frame 90 contains redundancy information used to correct up to 8 byte errors in the FEC block 102. Data transmission using the frame structure 90 suffers from substantial delay because of the need to receive a full FEC block 102 before performing error correction and because of the interleaving function.

FIG. 3B illustrates a prior art frame structure 110 that is intended to transport either asynchronous or synchronous payloads. The sync word 92, status word 94 and control word 96 fields are identical to those of the frame structure 90 of FIG. 3A. The payload field 112 in this case has a fixed length of 246 octets. A 1-octet frame check sequence (FCS) 114 is calculated across the control word 96 and payload fields 112, and represents the remainder polynomial in a CRC-8 calculation known in the art. The frame structure 110 does not use error correction or interleaving thereby reducing to some extent the delays inherent in frame 90.

The present invention provides a rate adaptive combination sync/async frame structure 120 shown in FIG. 3C that defines the order in which various bytes are output from the framers 24, 34 to the signal transmitters 26, 36, respectively, and the type of processing that each transport stream is to encounter. The frame 120 includes the 2-octet (2 bytes, 16 bits) sync word 92 and the 1-octet (1 byte, 8 bit) status word 94 as discussed above. The frame 120 also includes a plurality of uncoded payload words 122, each U octets wide, for the sync-ds 64 or sync-us 76 traffic streams alternated with a plurality of RS code words 124, each C octets wider for the ctrl-ds 50 and async-ds 52 or for the ctrl-us 55 and async-us 74 traffic streams.

The frame 120 consists of L octets, and starts with the 2-octet sync word 92 followed by the 1-octet status word 94. The remainder of the frame 120 consists of an N-octet payload portion consisting of alternating groups of uncoded payload 122 for synchronous streams (e.g. voice) and RS coded payload 124 for asynchronous streams (e.g. data).

The three integers (L, U, and C) are specified when defining the frame structure 120 of the present invention. As indicated above, L indicates the total number of octets in the frame 120. Following the status word 94 is U octets of uncoded payload 122 (voice stream). Following this is C octets of RS code words 124 (data stream). In the embodiment shown in FIG. 3C, the transmission of U uncoded 122 octets alternates with C RS code word 124 octets until the end of the L-octet frame 120 is reached. An end group 130 of f-octets in the frame 120 are either uncoded payload 122 or RS coded payload 124. It is not required that the end group 130 of f-octets be a full U or C octets long. In particular, f is bounded by the following equations:

$1 \leq f \leq U$—if end group 130 consist of uncoded payload 122 octets or $1 \leq f \leq C$—if end group 130 consists of RS code word 124 octets Further, either U or C can be set to 0, so that data can be of only one type.

Therefore, the following constraints are placed on U and C:

(1) $0 \leq U \leq N$;
(2) $0 \leq C \leq N$; and
(3) total of uncoded payload groups U 122; RS code word groups C 124 and the end group 130 (if any) is equal to N.

Transmission of mixed signals (voice/data) is most efficient when the frame 120 is structured with $U \leq C$, but as indicated above this is not a requirement for operability.

The aggregate of all of the RS code word pieces 124 found within one frame 120 constitute the FEC block 102 of the frame 90 of FIG. 3A where the first 2 octets are the control word 96 and the last 16 octets are the error correction redundancy FEC 100. As opposed to the frame 90, the FEC block (i.e. the C payloads 124 and possibly the end group 130) of frame 120 can be smaller than 137 bytes.

Frame synchronization between the downstream framer 24 and the upstream framer 34 is achieved through the 2-octet sync word 92. This ensures that the when the frame 120 is changed (i.e. the value of L is changed) both the upstream framer 34 and the downstream framer 24 are aware of the changes to ensure reliable and accurate data/voice transmission.

The control unit 42,43 is capable of dynamically changing the U and C variables to reflect changes in the traffic mix (sync/async) or line quality variations. For example, if all of the lines 49 of the PBX 48 are off-hook (i.e. in-use) the frame 120 can provide more octets of payload for voice traffic by increasing the value of U and decreasing the value of C at a given data rate. This will result in a substantial portion of the bandwidth of the loop 20 being used for voice traffic. At another instance in time, the lines 49 of the PBX 48 may be on-hook (i.e. inactive) and data demands from the LAN 44 could use bandwidth on the loop 20.

In this case, the control unit 42,43 can provide more octets of payload for data traffic by reducing U and increasing C to reflect the change in demands. By using the framing structure 120 that supports imbedded rate adaptive synchronous and asynchronous traffic the system 10 can adapt in real-time to changes in demands of the loop 20 from synchronous and asynchronous traffic streams as illustrated in the following generalized examples. Detailed tables illustrating payload distribution between coded and uncoded payload for various data rates and voice channels (VC) are also provided below.

EXAMPLE 1

Environment: communications system 10 of FIG. 1
Load on DSL: essentially an equal traffic mix between voice (sync) traffic from the PBX 48 and data (async) traffic from the LAN 44
Frame variables: L=252, N=249 and U (voice) and C (data) are both assigned a value of 50, the remaining payload octets (i.e. f=49) are assigned for voice in the end group 130
Resulting frame: the payload portion of the frame will prescribe the following alternating groups for sync/async traffic: 50 octets for voice, 50 octets for data, 50 octets for voice, 50 octets for data, and end group of 49 octets for voice for a total payload of 249 octets.

EXAMPLE 2

Environment: communications system 10 of FIG. 1

Load on DSL: the load distribution in the system 10 changes due to extreme demands made on the loop 20 by the PBX 48; therefore voice (sync) traffic from the PBX 48 greatly exceeds data (async) traffic from the LAN 44

Frame variables: the frame 120 of FIG. 3C is dynamically modified to reflect the change in traffic over the loop 20; therefore, L and N remain fixed at 252, 249 octets respectively, but U (voice) is increased to 75 octets and C (data) is reduced to 25 octets, the remaining payload octets (i.e. f=49) are assigned for voice in the end group 130

Resulting frame: the payload portion of the frame 120 will prescribe the following alternating groups for sync/async traffic: 75 octets for voice, 25 octets for data, 75 octets for voice, 25 octets for data, and end group of 49 octets for voice for a total payload of 249 octets.

The method of adapting the payload distribution between voice (U) and data (C) will be described in conjunction with FIG. 4 and Tables A1/2, B1/2, and C1/2. The Tables A–C provide examples of values for U, C, f, and G that can be used in the system 10 of FIG. 1 at various data rates. The variable U represents the number of consecutive uncoded bytes (for voice). The variable C represents the number of consecutive coded bytes (for data). The variable f represents the number of coded bytes in the end group 130 of the frame 120. The variable G represents the number of groups for each of U and C/f contained within the payload portion of the frame 120. The values in the Tables A–C have been calculated for a total frame size of 252 bytes (L=252) and a resulting total payload of 249 bytes (N=249).

For example, referring to Table A1, at a data rate of 504 kbits/s with one voice channel the variables are defined as: U=2, C=14, f=7, and G=16. Therefore, the payload portion of the frame 120 includes a total of 16 groups of 2 byte sections for uncoded payload (a total of 32 bytes) alternating with 15 (G−1) groups of 14 byte sections and 1 group (end group) of 7 bytes for coded payload (a total of 217 bytes).

The voice channels (or voice frequency data) is made of 64 kbit/s channels where 8-bit samples of the voice waveform are carried at an interval of 125 $\mu$s for an 8 kHz sampling rate. The overall digital data rates have been adjusted to obtain 252-byte frames. The frame duration is a multiple of 125 $\mu$s such that an integer number of voice samples can be transported in each frame 120.

Table A1 is representative of a system supporting a limited number of voice channels (VC=1 to 4) and using a lower overall data rate. Table B1 is representative of a system supporting a larger number of voice channels (VC=5 to 8) and a higher aggregate data rate. Table C1 is representative of a system supporting even more voice channels (VC=9 to 12).

Table A2 provides a comparison of payload allocation between voice (U) and data (C) when the system is operating with one voice channel and when it is operating with four voice channels. For example, with the system 10 operating at a data rate of 672 kbits/s, the payload portion of the frame 120 includes 24 ($T_U$) total bytes for voice (U) and 225 ($T_C$) total bytes for data (C) when one voice channel is active on the PBX 48. In contrast, when four voice channels are active on the PBX 48, 96 ($T_U$) total bytes are allocated for voice (U) and 153 ($T_C$) total bytes are allocated for data (C). Tables B2 and C2 provide similar comparisons between (5 vs. 8) voice channels and (9 vs. 12) voice channels, respectively, at various data rates.

The system 10 can add or drop voice channels while maintaining the aggregate data rate by selecting new values of U and C in performing a horizontal move in Table A1, B1, or C1. The value of f does not need to be programmed, it simply defaults to the number of bytes left in the end block 130 of the frame 120. For example (with reference to Table A1), if one voice channel is in use at a data rate of 896 kbits/s and two additional voice channels (total VC=3) are required and the data rate is maintained then the following adjustments are made: U is increased from 2 to 6 and C is decreased from 26 to 22.

A change to the number of voice channels can be done in response to phone extensions 49 going on-hook and off-hook and opens the unused capacity to be used by the computer data traffic from the LAN 44.

The system 10 can change the aggregate data rate while maintaining the number of voice channels by selecting new values of U and C by performing a vertical move in Tables A1, B1, C1. For example (with reference to Table B1), if the data rate is reduced from 1792 kbits/s to 1152 kbits/s and six voice channels are maintained then the following adjustments are made: C is decreased from 22 to 12 and G is increased from 9 to 14.

A change to the aggregate data rate can be done in response to a variation in the noise level or signal quality over the loop 20. A reduction in the data rate would allow the system 10 to restore an adequate signal-to-noise (SNR) ratio in order to maintain a target bit error rate. An increase in the data rate would achieve the opposite effect after an increase in the SNR. Details of this operation is discussed below in conjunction with FIG. 4.

TABLE A1

| Data Rate (kbits/s) | Frame Duration (msec) | Group Count (G) | Number of Voice Channels | | | | | | | | | | | |
|---|---|---|---|---|---|---|---|---|---|---|---|---|---|---|
| | | | 1 | | | 2 | | | 3 | | | 4 | | |
| | | | U | C | f | U | C | f | U | C | f | U | C | f |
| 504 | 4.0 | 16 | 2 | 14 | 7 | 4 | 12 | 5 | 6 | 10 | 3 | 8 | 8 | 1 |
| 576 | 3.5 | 14 | 2 | 16 | 13 | 4 | 14 | 11 | 6 | 12 | 9 | 8 | 10 | 7 |
| 672 | 3.0 | 12 | 2 | 19 | 16 | 4 | 17 | 14 | 6 | 15 | 12 | 8 | 13 | 10 |
| 806.4 | 2.5 | 10 | 2 | 23 | 22 | 4 | 21 | 20 | 6 | 19 | 18 | 8 | 17 | 16 |
| 896 | 2.25 | 9 | 2 | 26 | 23 | 4 | 24 | 21 | 6 | 22 | 19 | 8 | 20 | 17 |
| 1008 | 2.0 | 8 | 2 | 30 | 23 | 4 | 28 | 21 | 6 | 26 | 19 | 8 | 24 | 17 |

TABLE A2

PAYLOAD DISTRIBUTION: ONE VS. FOUR VOICE CHANNELS

| Data Rate (kbits/s) | Total Uncoded Payload $T_U = [U \times G]$ bytes | | Total Coded Payload $T_C = [C \times (G-1) + f]$ bytes | | Payload Ratio $T_U/T_C$ | |
|---|---|---|---|---|---|---|
| | 1 VC | 4 VC | 1 VC | 4 VC | 1 VC | 4 VC |
| 504   | 32 | 128 | 217 | 121 | 0.147 | 1.058 |
| 576   | 28 | 112 | 221 | 137 | 0.127 | 0.818 |
| 672   | 24 | 96  | 225 | 153 | 0.107 | 0.627 |
| 806.4 | 20 | 80  | 229 | 169 | 0.087 | 0.473 |
| 896   | 18 | 72  | 231 | 177 | 0.078 | 0.407 |
| 1008  | 16 | 64  | 233 | 185 | 0.069 | 0.346 |

TABLE C2

PAYLOAD DISTRIBUTION: NINE VS. TWELVE VOICE CHANNELS

| Data Rate (kbits/s) | Total Uncoded Payload $T_U = [U \times G]$ bytes | | Total Coded Payload $T_C = [C \times (G-1) + f]$ bytes | | Payload Ratio $T_U/T_C$ | |
|---|---|---|---|---|---|---|
| | 9 VC | 12 VC | 9 VC | 12 VC | 9 VC | 12 VC |
| 2016   | 72 | 96 | 177 | 153 | 0.407 | 0.627 |
| 2304   | 63 | 84 | 186 | 165 | 0.339 | 0.509 |
| 2688   | 54 | 72 | 195 | 177 | 0.277 | 0.407 |
| 3229.6 | 45 | 60 | 204 | 189 | 0.221 | 0.317 |
| 4032   | 36 | 48 | 213 | 201 | 0.169 | 0.239 |

TABLE B1

| Data Rate (kbits/s) | Frame Duration (msec) | Group Count (G) | Number of Voice Channels | | | | | | | | | | | |
|---|---|---|---|---|---|---|---|---|---|---|---|---|---|---|
| | | | 5 | | | 6 | | | 7 | | | 8 | | |
| | | | U | C | f | U | C | f | U | C | f | U | C | f |
| 1008   | 2.0   | 16 | 5 | 11 | 4  | 6 | 10 | 3  | 7 | 9  | 2  | 8 | 8  | 1  |
| 1152   | 1.75  | 14 | 5 | 13 | 10 | 6 | 12 | 9  | 7 | 11 | 8  | 8 | 10 | 7  |
| 1344   | 1.5   | 12 | 5 | 16 | 13 | 6 | 15 | 12 | 7 | 14 | 11 | 8 | 13 | 10 |
| 1612.8 | 1.25  | 10 | 5 | 20 | 19 | 6 | 19 | 18 | 7 | 18 | 17 | 8 | 17 | 16 |
| 1792   | 1.125 | 9  | 5 | 23 | 20 | 6 | 22 | 19 | 7 | 21 | 18 | 8 | 20 | 17 |
| 2016   | 1.0   | 8  | 5 | 27 | 20 | 6 | 26 | 19 | 7 | 25 | 18 | 8 | 24 | 17 |

TABLE B2

PAYLOAD DISTRIBUTION: FIVE VS. EIGHT VOICE CHANNELS

| Data Rate (kbits/s) | Total Uncoded Payload $T_U = [U \times G]$ bytes | | Total Coded Payload $T_C = [C \times (G-1) + f]$ bytes | | Payload Ratio $T_U/T_C$ | |
|---|---|---|---|---|---|---|
| | 5 VC | 8 VC | 5 VC | 8 VC | 5 VC | 8 VC |
| 1008   | 80 | 128 | 169 | 121 | 0.473 | 1.058 |
| 1152   | 70 | 112 | 179 | 137 | 0.391 | 0.818 |
| 1344   | 60 | 96  | 189 | 153 | 0.317 | 0.627 |
| 1612.8 | 50 | 80  | 199 | 169 | 0.251 | 0.473 |
| 1792   | 45 | 72  | 204 | 177 | 0.221 | 0.407 |
| 2016   | 40 | 64  | 209 | 185 | 0.191 | 0.346 |

TABLE C1

| Data Rate (kbits/s) | Frame Duration (msec) | Group Count (G) | Number of Voice Channels | | | | | | | | | | | |
|---|---|---|---|---|---|---|---|---|---|---|---|---|---|---|
| | | | 9 | | | 10 | | | 11 | | | 12 | | |
| | | | U | C | f | U | C | f | U | C | f | U | C | f |
| 2016   | 1.0   | 8 | 9 | 23 | 16 | 10 | 22 | 15 | 11 | 21 | 14 | 12 | 20 | 13 |
| 2304   | 0.875 | 7 | 9 | 27 | 24 | 10 | 26 | 23 | 11 | 25 | 22 | 12 | 24 | 21 |
| 2688   | 0.75  | 6 | 9 | 33 | 30 | 10 | 32 | 29 | 11 | 31 | 28 | 12 | 30 | 27 |
| 3229.6 | 0.625 | 5 | 9 | 41 | 40 | 10 | 40 | 39 | 11 | 39 | 38 | 12 | 38 | 37 |
| 4032   | 0.50  | 4 | 9 | 54 | 51 | 10 | 53 | 50 | 11 | 52 | 49 | 12 | 51 | 48 |

Figure 4:
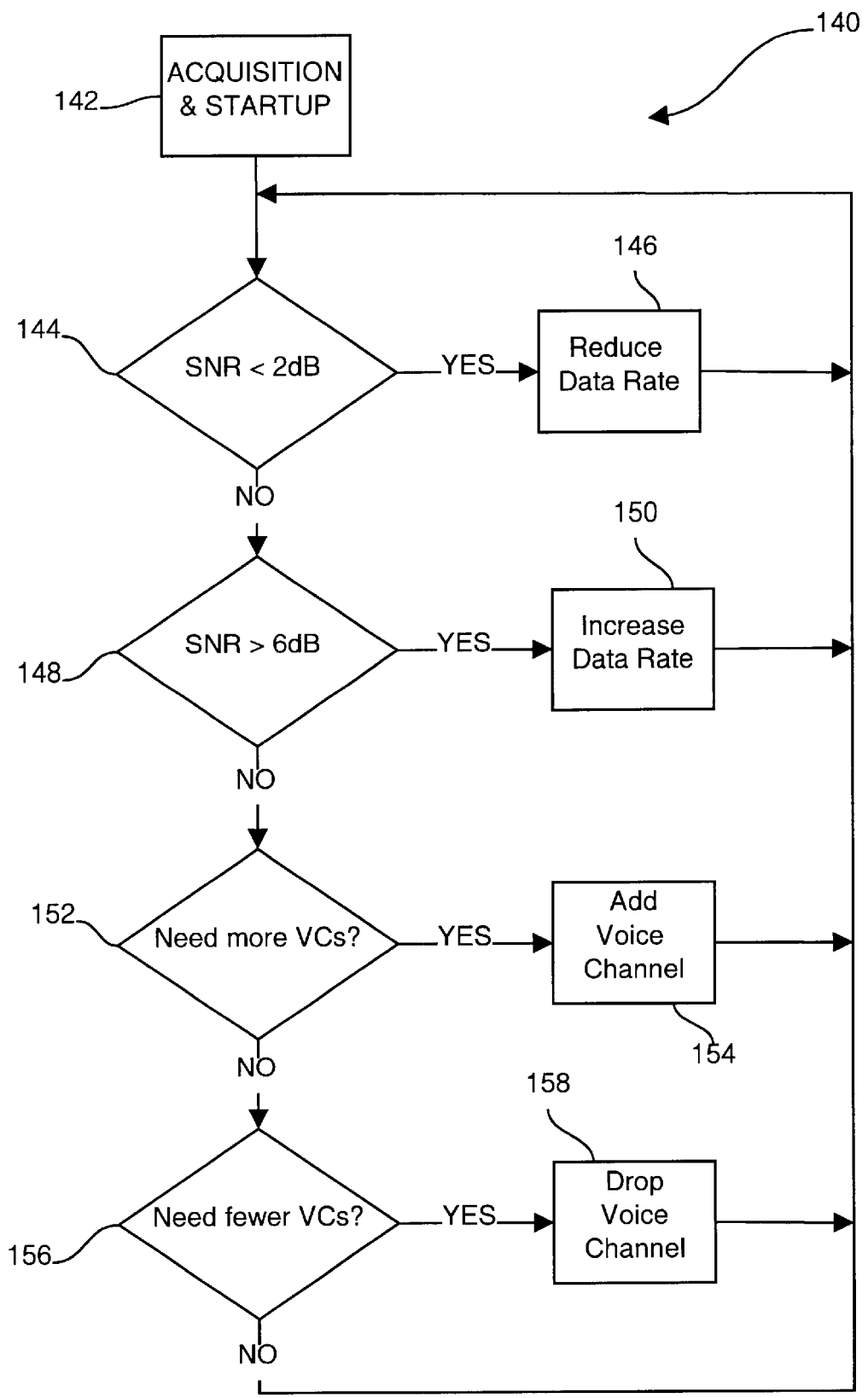
FIG. 4 illustrates a flow chart for adapting the parameters of the frame of FIG. 3C to accommodate various amounts of synchronous and asynchronous traffic.

The flow chart of FIG. 4 details a method 140 of modifying the payload distribution (between voice and data) of the frame 120 during operation of the system 10. The frame 120 is initialized at an acquisition and start-up phase at step 142 that includes the initialization of the parameters U, C, f, and G. The method 140 embodied in the flow chart is executed by a control element such as a micro-controller or an equivalent known in the art, and is included in the control units 42 and 43 of FIG. 1.

The signal-to-noise ratio (SNR) over the loop 20 is detected at step 144. If the SNR is less than 2 dB than the data rate is reduced at step 146 and processing is returned to step 144. If the SNR is greater than 6 dB, as determined at step 148, then the data rate is increased at step 150 and processing is returned to step 144. A change to the data rate is accomplished by changing the constellation size or the symbol rate in the case of a transceiver using standard QAM techniques. The SNR thresholds discussed above are a design choice and can be changed to accommodate various operating environments.

If more voice channels are required, as determined at step 152, then a voice channel is added at step 154 and processing is returned to step 144. If fewer voice channels are required, as determined at step 156, than a voice channel is dropped at step 158 and processing is returned to step 144. Examples of the changes made to the parameters U and C when a voice channel is added or dropped at a given data rate are detailed in the Tables A1–C1 above.

A change to the number of voice channels can be prepared in advance by exchanging information over the control units 42 and 43. A bit of the status word 94 of the frame 120 can be used as a trigger such that both units 42 and 43 know the exact frame that is going to start using the new parameters (U, C). In this way a transition can be done without a quality reduction on the existing voice channels.

The time required to execute the steps 144 to 156 vary but it is typically relatively long (in the order of seconds) to avoid frequent disruption to the data flow.

In summary, the framing structure 120 of the present invention provides:

(a) the transport of imbedded rate adaptive uncoded payload 122 (U octets) along with the coded payloads 124 (C octets);

(b) the distribution of uncoded payload 122 throughout the frame 120 to minimize the associated transport latency; and (c) allows the delineation of RS blocks 124, and the payload and parity within those blocks, so that an additional layer of framing is not needed. In particular, since performing error correction on the Reed Solomon block 124 requires knowing the block boundary, if the block 124 was to span two frames 120, the odd and even frames would have to be identified.

What is claim is:

1. A frame having a payload portion supporting imbedded synchronous and asynchronous traffic for communication over a digital subscriber line having a prescribed data late, comprising:

(a) a first payload group of U octets of uncoded payload for the synchronous traffic in the payload portion of the frame;

(b) a second payload group of C octets of coded payload for the asynchronous traffic in the payload portion of the frame;

(c) said first payload group is divided into a plurality of synchronous sections and said second payload group is divided into a plurality of asynchronous sections wherein the synchronous sections of the first payload group alternate with the asynchronous sections of the second payload group;

(d) the values of U and C are respectively modifiable to accommodate changes in traffic load and data traffic rate within the bounds:

$$0 \leq U \leq N;$$

$$0 \leq C \leq N;$$

where N=total length of the payload portion of the frame; and (e) the value of C is increased and the value of U is decreased without a change in traffic load in response to an improvement in signal quality over the digital subscriber line, if the improved signal quality enables an increase in the prescribed data rate.

2. The frame of claim 1, wherein the second payload group includes error correction redundancy.

3. The frame of claim 1, wherein the value of U is increased and the value of C is correspondingly decreased in response to an increase in synchronous traffic over the digital subscriber line.

4. A frame having a payload portion supporting imbedded synchronous and asynchronous traffic for communication over a digital subscriber line having a prescribed data rate, comprising:

(a) a first payload group of U octets of uncoded payload for the synchronous traffic in the payload portion of the frame;

(b) a second payload group of C octets of coded payload for the asynchronous traffic in the payload portion of the frame;

(c) said first payload group is divided into a plurality of synchronous sections and said second payload group is divided into a plurality of asynchronous sections wherein the synchronous sections of the first payload group alternate with the asynchronous sections of the second payload group;

(d) the values of U and C are respectively modifiable to accommodate changes in traffic load and data traffic rate within the bounds:

$$0 \leq U \leq N;$$

$$0 \leq C \leq N;$$

where N=total length of the payload portion of the frame; and (e) the value of U is increased and the value of C is decreased without a change in traffic load in response to an degradation in signal quality over the digital subscriber line, if the degraded signal quality requires a decrease in the prescribed data rate.

5. In a communication system transmitting a prescribed data rate over a digital subscriber line for simultaneously accommodating synchronous traffic from a synchronous device and asynchronous traffic from an asynchronous device, an apparatus for framing a payload portion of a data frame, comprising:

(a) a control unit for determining a prescribed value of U of uncoded payload octets for the synchronous traffic in the payload portion of the frame, and a prescribed value of C of coded payload octets for the asynchronous traffic in the payload portion of the frame;

(b) the control unit divides the U octets into a plurality of first payload groups and divides the C octets into a plurality of second payload groups, and the plurality of first payload groups alternate with tie plurality of second payload groups;

(c) an algorithm for modifying the values of U and C to adapt to variations in demand for synchronous traffic and data transfer rate over the digital subscriber line; and (d) the algorithm includes means for increasing C and decreasing U in response to an increase in the prescribed data rate over the digital subscriber line.

6. The apparatus of claim 5, wherein the control unit includes error correction redundancy in the plurality of second payload groups.

7. The apparatus of claim 5, wherein the algorithm includes means for increasing U and decreasing C in response to an increase in synchronous traffic over the digital subscriber line.

8. The apparatus of claim 5, wherein the algorithm includes means for decreasing U and increasing C in response to a decrease in synchronous traffic over the digital subscriber line.

9. The apparatus of claim 5, wherein the algorithm includes means for decreasing C and increasing U in response to a decrease in the prescribed data rate over die digital subscriber line.

10. A control unit for controlling a framer for assembling a frame having a synchronization word, a status word and a payload portion supporting imbedded synchronous and asynchronous tic for communication at a prescribed data rate over a digital subscriber line, the control unit comprising:

(a) an algorithm for determining a prescribed size of a first payload group for the synchronous traffic in the payload portion of the frame, said first payload group including U octets of uncoded payload and a prescribed size of a second payload group for the asynchronous traffic in the payload portion of the frame, said second payload group including C octets of coded payload; and (b) the algorithm modifying the prescribed size of the first payload group and the prescribed size of the second payload group to adapt to variations in demand for synchronous traffic and data transfer rate over the digital subscriber line;

(c) the control unit controlling the frame to divide said first payload group into a plurality of synchronous sections and said second payload group into a plurality of asynchronous sections, and the control unit further controlling the framer so that the synchronous sections of the first payload group are alternated with the asynchronous sections of the second payload group; and (d) the algorithm includes means for increasing the prescribed size of the second payload group and decreasing the prescribed size of the first payload group in response to an increase in the prescribed data rate over the digital subscriber line.

11. The control unit of claim 10, wherein the control unit encodes the second payload group with error correction redundancy.

12. The control unit of claim 10, wherein the algorithm includes means for increasing the prescribed size of the first payload group and decreasing tie prescribed size of the second payload group in response to an increase in synchronous traffic over the digital subscriber line.

13. The control unit of claim 10, wherein the algorithm includes means for decreasing the prescribed size of the first payload group and increasing the prescribed size of the second payload group in response to a decrease in synchronous traffic over the digital subscriber line.

14. The control unit of claim 10, wherein the algorithm includes means for decreasing the prescribed size of the second payload group and increasing the prescribed size of the first payload group in response to a decrease in the prescribed data rate over the digital subscriber line.

* * * * *